(12) United States Patent
Hersant (10) Patent No.: US 12,522,488 B2
(45) Date of Patent: Jan. 13, 2026

(54) FORKLIFT TRUCK MOUNTED ON A CARRIER VEHICLE (71) Applicant: MANITOU BF, Ancenis (FR)

(72) Inventor: Pierre Hersant, Ancenis (FR)

(73) Assignee: MANITOU BF, Ancenis (FR)

( * ) Notice: Subject to any disclaimer, the term of this patent is extended or adjusted under 35 U.S.C. 154(b) by 1190 days.

(21) Appl. No.: 17/427,839

(22) PCT Filed: Jan. 27, 2020

(86) PCT No.: PCT/FR2020/050118
§ 371 (c)(1),
(2) Date: Mar. 28, 2022

(87) PCT Pub. No.: WO2020/161409
PCT Pub. Date: Aug. 13, 2020

(65) Prior Publication Data
US 2022/0242710 A1 Aug. 4, 2022

(30) Foreign Application Priority Data

Feb. 5, 2019 (FR) ..................................... 19 01109

(51) Int. Cl.
B66F 9/22 (2006.01)
B60P 3/06 (2006.01)
(Continued)

(52) U.S. Cl.
CPC .................... B66F 9/22 (2013.01);
B60P 3/06 (2013.01); B66F 9/07563
(2013.01); F15B 2011/0243 (2013.01); F15B
2011/0246 (2013.01)

(58) Field of Classification Search
CPC . B66F 9/22; B66F 9/07563; F15B 2011/0243
See application file for complete search history.

(56) References Cited

FOREIGN PATENT DOCUMENTS

DE 19800721 A1 * 7/1999 ............. B66C 13/18
FR 2 298 454 8/1976
(Continued)

OTHER PUBLICATIONS

Machine Translation of DE19800721.*
International Search Report dated Dec. 17, 2019.

Primary Examiner — Diem M Tran
(74) Attorney, Agent, or Firm — IPSILON USA, LLP (57) ABSTRACT Forklift truck (1) mounted on a carrier vehicle and comprising a frame (16), forks (2), a lifting cylinder (4) for relatively moving the forks (2) and the frame (16) so as to allow, in a handling mode of operation, wherein the forks (2) are mounted so as to move freely upwards and downwards relative to the ground, the forks (2) to be lifted, and in a carrying mode of operation, wherein the forks (2) are in the high position and immobilised so that they do not move upwards and downwards relative to the ground, to allow the frame to be lifted (16), each chamber (7, 8) of the cylinder (4) being provided with a connecting fluid duct which connects the chamber (7; 8) to a hydraulic source. In the handling mode of operation, the forks (2) form an element which is used to actuate the lifting cylinder (4) in the direction in which the forks (2) are lowered, the fluid ducts of the chambers (7, 8) of the lifting cylinder (4) being connected to one other by a fluid connection provided with a closing member in the closed position at least in the carrying mode of operation when the frame (16) is being driven in the direction in which the frame (16) is lifted.

11 Claims, 8 Drawing Sheets (51) Int. Cl.
   *B66F 9/075*      (2006.01)
   *F15B 11/024*     (2006.01)

(56)              References Cited

FOREIGN PATENT DOCUMENTS

JP           S52 4677       1/1977
   JP         H07 291592      11/1995
   JP         2011 225287     11/2011

* cited by examiner

FORKLIFT TRUCK MOUNTED ON A CARRIER VEHICLE

RELATED APPLICATION

This application is a National Phase of PCT/FR2020/050118 filed on Jan. 27, 2020, which claims the benefit of priority from French Patent Application No. 19 01109, filed on Feb. 5, 2019, the entirety of which are incorporated by reference.

FIELD OF THE INVENTION

The present invention relates to a forklift truck mounted on a carrier vehicle, preferably at the rear of said vehicle.

More particularly, it relates to a forklift truck comprising a frame, forks for handling of a load and coupling of the truck to a carrier vehicle, means for connection of the forks to the frame, said connection means comprising at least one lifting jack to drive the forks and the frame in relative displacement in the direction of approach towards one another and moving away from one another in order to permit raising of the forks in a so-called handling operating mode, wherein the forks are mounted such as to be free in upward and downward displacement relative to the ground, and to permit raising of the frame in a so-called transport operating mode, wherein the forks are in the high position and their displacement upwards and downwards relative to the ground is immobilized, the or each lifting jack comprising at least one body and a piston rod which divides the body into two chambers, this lifting jack being a double-effect lifting jack, each chamber of which is equipped with a fluid duct for connection of the chamber to a hydraulic source comprising a pump and a reservoir at atmospheric pressure via a distributor for supply of fluid to one or the other of the chambers.

DESCRIPTION OF RELATED ART

A forklift truck of this type is described in particular in patent FR2298454. Similarly, document JP5524677 describes a forklift truck. The solutions which are implemented at present generate excess consumption of energy resulting from substantial load losses and high pressures for control of the lifting jack. This excess consumption of energy is detrimental to the other functions of the truck, and in particular to the function of advance of the truck.

OBJECTS AND SUMMARY

An objective of the invention is to propose a forklift truck of the aforementioned type, the design of which permits reduction of the energy consumption.

For this purpose, the subject of the invention is a forklift truck mounted on a carrier vehicle, said truck comprising a frame, forks for handling of a load and coupling of the truck to a carrier vehicle, means for connection of the forks to the frame, said connection means comprising at least one lifting jack to drive the forks and the frame in relative displacement in the direction of approach towards one another and moving away from one another in order to permit raising of the forks in a so-called handling operating mode, wherein the forks are mounted such as to be free in upward and downward displacement relative to the ground, and to permit raising of the frame in a so-called transport operating mode, wherein the forks are in the high position and their displacement upwards and downwards relative to the ground is immobilized, the or each lifting jack comprising at least one body and a piston rod which divides the body into two chambers, this lifting jack being a double-effect lifting jack, each chamber of which is equipped with a fluid duct for connection of the chamber to a hydraulic source comprising a pump and a reservoir via a distributor to permit supply of fluid to one or the other of the chambers, characterized in that, in the so-called handling operating mode, under the effect of their weight, the forks form a driving element for actuation of the or each lifting jack for the passage of the forks from the high position to the low position, and in that, for the or each lifting jack, the fluid ducts for connection of the chambers of the lifting jack to the hydraulic source are connected to one another by a fluid connection, in order to permit a transfer of fluid from one of the chambers in the direction of the other chamber of the jack, this fluid connection being equipped with a closing unit which is mounted such as to be mobile between a closed position and an open position of the fluid connection, this closing unit being in the closed position at least in the transport operating mode, in the state in which the frame is driven in the direction of raising of the frame.

The use in the handling operating mode of the weight of the forks as a driving element in order to permit control of lowering of the forks makes it possible to dispense with a high fluid pressure in the fluid intake chamber of the lifting jack. Thus, control of lowering of the forks can be obtained including in the state in which the pump is stopped, or with a fluid pressure of the chamber at discharge which is greater than the pressure of the fluid of the lifting jack fluid intake chamber. The presence of a fluid connection which can be closed between the ducts makes it possible to limit the phenomena of cavitation in the handling operating mode, in the state in which the forks are driven in displacement in the direction of lowering under the effect of their weight, without detracting from the possibilities of raising of the frame in the transport operating mode.

According to an embodiment of the invention, the closing unit of the fluid connection between the ducts is in the open position in the handling operating mode, in the state in which the forks are driven in the direction of lowering of the forks. In particular, opening of the connection makes it possible to limit the problems of cavitation of the lifting jack.

According to an embodiment of the invention, one of the chambers, known as the chamber for lowering of the forks of the or each lifting jack, which chamber is configured, in the handling operating mode, to be supplied with fluid from the other chamber, known as the chamber for lifting of the forks via the fluid connection between the ducts in the state in which the forks are driven in the direction of lowering of the forks, in the transport operating mode forms the chamber of said lifting jack which is supplied with fluid in the state in which the frame is driven in the direction of lifting of the frame.

According to an embodiment of the invention, one of the chambers, known as the chamber for lifting of the forks of the or each lifting jack, which chamber is configured, in the handling operating mode, to be supplied with fluid in the state in which the forks are driven in the direction of lifting of the forks, in the transport operating mode forms the chamber of said lifting jack which is supplied with fluid in the state in which the frame is driven in the direction of lowering of the frame.

According to an embodiment of the invention, the fluid connection between the ducts is placed on the portion of the ducts which extends between the distributor and the lifting jack.

According to an embodiment of the invention, the fluid connection between the ducts is provided with an offloading line which is equipped in its area of connection to the fluid connection with a pressure-sensitive valve which can go from the closed position to the open position of the offloading line according to the pressure which exists at the fluid connection between the ducts.

According to an embodiment of the invention, the fluid circulation duct which equips the chamber of the lifting jack known as the chamber for lowering of the forks at discharge, in the handling operating mode in the state in which the forks are driven in displacement for the passage of the forks from a low position to a high position, is provided with a unit for closing of the duct, which unit is sensitive to the pressure of the fluid of the fluid circulation duct of the other chamber, known as the lifting chamber, of the forks of the lifting jack, said closing unit being configured to go from the closed position to the open position of the duct, when the pressure on the duct of the lifting chamber of the forks of the lifting jack is greater than a predetermined value. This results in the possibility of controlled emptying of the chamber for lowering of the forks.

According to an embodiment of the invention, the unit for closing of the duct is mounted in parallel with a non-return valve. This non-return valve permits supply of fluid to the chamber for lowering of the forks of the lifting jack, when the pressure on the duct of the lifting chamber of the forks of the jack is lower than a predetermined value. This supply is advantageous in particular in transport operating mode, in the state of driving in displacement of the frame in the direction of raising, i.e. in the direction of bringing the forks towards the frame, which forks themselves are in the high position.

According to an embodiment of the invention, the unit for closing of the fluid connection between the ducts is a closing unit with manual control which can be actuated by the driver of the truck.

According to an embodiment of the invention, the unit for closing of the fluid connection between the ducts is a solenoid valve which is normally preferably open.

BRIEF DESCRIPTION OF THE DRAWINGS

The invention will be well understood by reading the following description of embodiments with reference to the appended drawings in which.

DETAILED DESCRIPTION:

As previously stated, the invention relates to a forklift 2 truck 1 mounted on a carrier vehicle 20, such as a truck, in particular at the rear of the carrier vehicle 20, in order thus to be transported after having been used for example for the loading and unloading of the carrier vehicle 20.

For receipt of a forklift truck 1 of this type, the rear of the carrier vehicle 20 generally comprises two longitudinal sleeves in the interior of which the forks 2 of the forklift truck 1 can be inserted in the high position, in order then, by actuation of the forks of the truck in the direction of lowering, to permit raising of the frame 16 of the forklift truck 1 in the direction of bringing the frame 16 closer to the forks 2 which are partly inserted in the sleeves. Once the raising of the frame 16 has been completed, a sliding support of the carrier vehicle 20 can be placed partly projecting from the rear of the carrier vehicle 20, in order to form a support for receipt of the forklift truck 1. Chains can be used as a substitute or as complement for the sliding support. A combination of hooks and shafts on the forklift truck 1 and on the carrier vehicle 20 can also replace the receipt support.

A forklift truck 1 of this type can be a forklift truck 1 with a driver on board seated in a control cab of the truck 1. A forklift truck 1 of this type can be a forklift truck 1 with an accompanying driver without a control cab. A driver station is provided. This truck 1, which comprises a rolling frame 16, forks 2, means 3 for connection of the forks 2 to the frame 16 comprising at least one lifting jack 4 for driving in relative displacement of the forks 2 and of the frame 16 in the direction of bringing closer to, and spacing apart from, one another, in order, in a so-called handling operating mode in which the forks 2 are mounted such as to be free in raising and lowering displacement relative to the ground, to permit raising of the forks 2, and, in a so-called transport operating mode, in which the forks 2 are in the high position and immobilized in raising and lowering displacement relative to the ground, to permit raising of the frame 16, is perfectly well known. It will therefore not be described in detail for the part relating to the connection of the forks to the frame via the at least one lifting jack 4, with this connection being able to have a large number of forms. Similarly, the immobilization in raising and lowering of the forks 2 in the high position in transport operating mode, which can take place as described above by insertion of the forks 2 into sleeves of the carrier vehicle 20, will not be described in greater detail.

It should be noted that the following description will be provided with reference to a lifting jack 4, but, in an equivalent manner, the forklift truck 1 could comprise a pair of two identical lifting jacks mounted in parallel on the control circuit which will be described hereinafter, and working jointly in synchronism, without departing from the context of the invention. For this reason, a lifting jack 4 will be understood to be both a single jack and a pair of jacks.

This lifting jack 4, which extends between the forks 2 and the frame 16, comprises a body 5 and a piston rod 6 dividing the body 5 into two chambers represented as 7 and 8 in the figures. Generally, and as represented, the body 5 of the lifting jack 4 is coupled to the frame 16, and the rod 6 of the jack 4 is coupled to the forks 2. In the handling operating mode, extension of the jack gives rise to raising of the forks 2. Conversely, in the handling operating mode, the retraction of the lifting jack 4 gives rise to lowering of the forks 2 of the forklift truck 1.

In the handling operating mode, these forks 2 are thus mounted such as to be mobile between a low position and high position.

This lifting jack 4 is a double-effect jack, since each chamber 7, 8 of the jack can be supplied with hydraulic fluid from a hydraulic source 9. In the examples represented, the hydraulic source 9 comprises a hydraulic pump 91 which develops high pressure, this hydraulic pump being able to be actuated for example by a thermal engine, not represented.

This hydraulic source 9 also comprises a reservoir 92 at atmospheric pressure. At least one distributor 93 is interposed between the pump 91 of the hydraulic source 9 and each of the chambers 7, 8 of the lifting jack 4. The chamber 7, which is known hereinafter as the chamber 7 for lifting of the forks, in this case forms the large chamber of the lifting jack 4, which chamber is placed on the cylinder side of the lifting jack 4, whereas the chamber 8 which is known hereinafter as the chamber 8 for lowering of the forks, is in this case the small chamber of the lifting jack 4, i.e. the one which is placed on the piston rod side.

The chamber 7 for lifting of the forks, which is thus known because it forms the chamber for intake of fluid of the lifting jack 4 in the state in which the forks are driven in the direction of raising in the handling operating mode, can be connected to the pump 4 of the hydraulic source 9 via the distributor 93, by means of a fluid circulation duct represented at C1 in the figures, whereas the chamber 8 for lowering of the forks, which is thus known because it forms the chamber for intake of fluid of the lifting jack 4 in the state in which the forks are driven in the direction of lowering in the handling operating mode, can be connected to the pump 91 of the hydraulic source 9 via the hydraulic distributor 93, by means of a fluid circulation duct represented at C2 in the figures.

In a manner which is characteristic of the invention in the so-called handling operating mode, in which the forks 2 are mounted such as to be free in raising and lowering displacement relative to the ground, under the effect of their weight the forks 2 form a driving element for actuation of the lifting jack 4, for the passage of the forks 2 from the high position to the low position.

Figure 7:
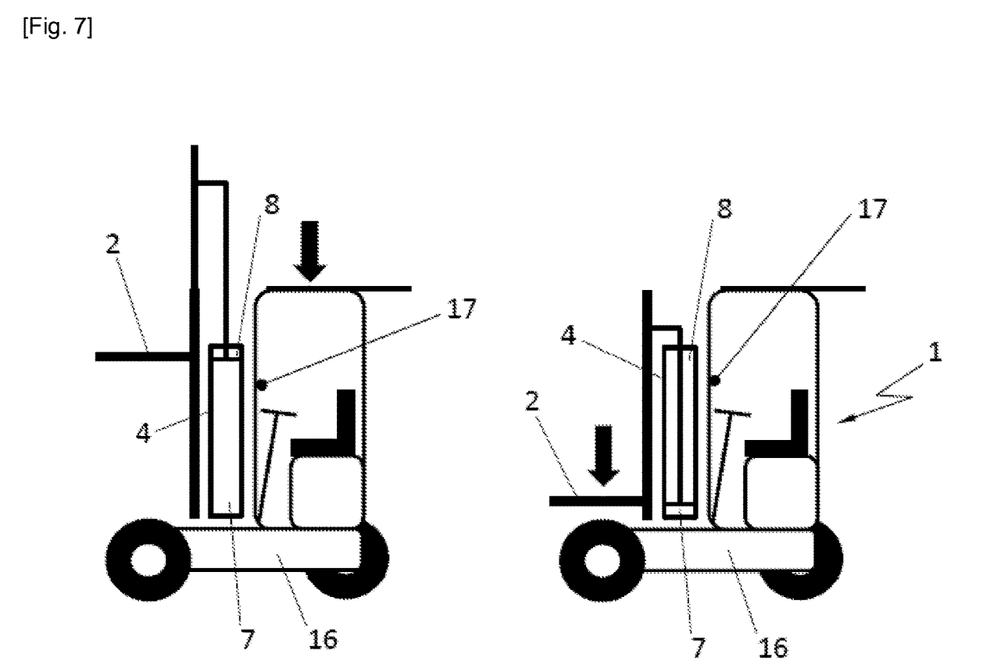
FIG. 7 represents a schematic view of two forklift trucks in order to illustrate the passage of the forks from the high position to the low position in handling operating mode.
Figure 8:
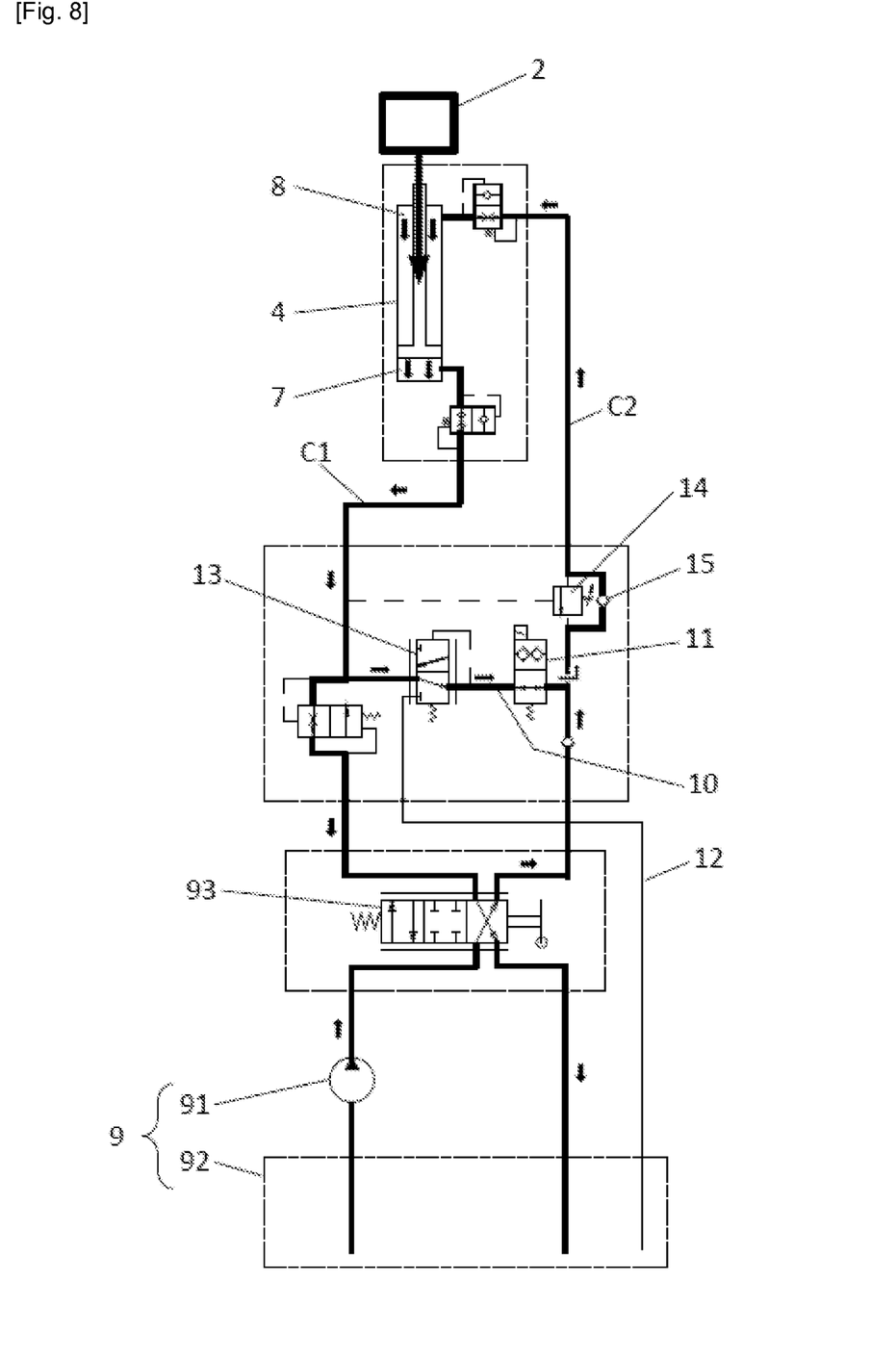
FIG. 8 represents the hydraulic circuit corresponding to the operation described in FIG. 7.

In this configuration in conformity with the one represented in FIGS. 7 and 8, it can be noted that the fluid ducts C1 and C2 for connection of the chambers 7 and 8 of the lifting jack 4 to the hydraulic source 9 are connected to one another by a fluid connection 10 in order to permit transfer of fluid from one of the chambers in the direction of the other chamber of the jack. This fluid connection 10 permits force-filling of the chamber 8 for lowering of the forks, and prevents so-called cavitation phenomena.

This fluid connection 10 between the ducts C1 and C2 is placed on the portion of the ducts C1 and C2 which extends between the distributors 93 and the lifting jack 4. Thus, in the handling operating mode, in the state in which the forks are driven in the direction of lowering, the pressure which exists in the fluid supply duct C2 of the chamber for lowering of the forks can be lower than the pressure which exists in the duct C1 for emptying of the chamber 7 for lifting of the forks.

In this handling operating mode, the forks as driving elements can go from the high position to the low position, including in the state in which the pump 91 is at a standstill.

If necessary, the pump 91 of the hydraulic source 9 can be actuated in this handling operating mode in order to complete the supply of fluid to the chamber 8 for lowering of the forks. However, the presence of the fluid connection 10 and the fact that the fork is used as a driving element minimize recourse to the pump 91. This results in a saving of power which can be used for other purposes, as well as in a saving of energy.

The fluid connection 10 is equipped with a closing unit 11, mounted by means of a control unit which can be actuated by the driver of the truck, which unit is mobile between a closed position and an open position of the connection.

The unit 11 for closing of the fluid connection 10 between the ducts C1, C2 is in the open position in the handling operating mode, in the state in which the forks 2 are driven in the direction of lowering of the forks 2, in order to permit transfer of fluid between said chambers 7, 8 of the lifting jack 4.

This unit 11 for closing of the fluid connection 10 between the ducts C1, C2 is a solenoid valve which is preferably normally open.

This unit 11 for closing of the fluid connection 10 between the ducts C1, C2 is in this case a manually controlled 17 closing unit 11 which can be actuated by the driver of the truck 1. As a variant, the unit 11 for closing of the fluid connection 10 can have automatic control, as will be described hereinafter.

The fluid connection 10 between the ducts C1, C2 is provided with an offloading line 12, which is equipped in its area of connection to the connection 10 with a pressure-sensitive valve 13, which can go from the closed position to the open position of the offloading line 12 according to the pressure which exists in the fluid connection 10 between the ducts C1 and C2.

Figure 1:
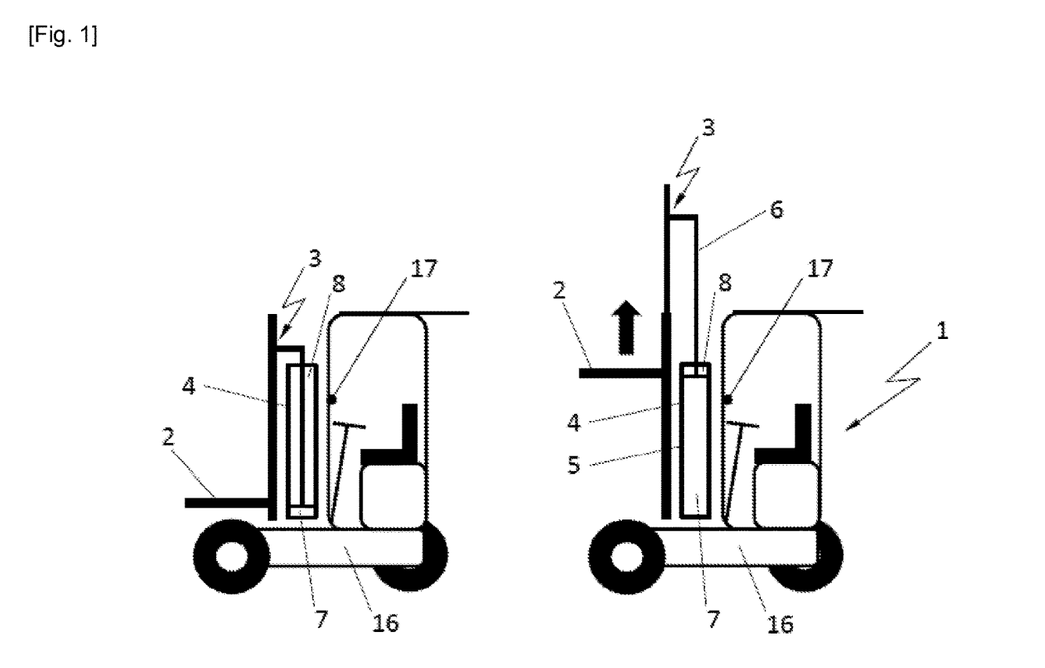
FIG. 1 represents a schematic view of two forklift trucks in order to illustrate the passage of the forks from the low position to the high position in the handling operating mode.
Figure 2:
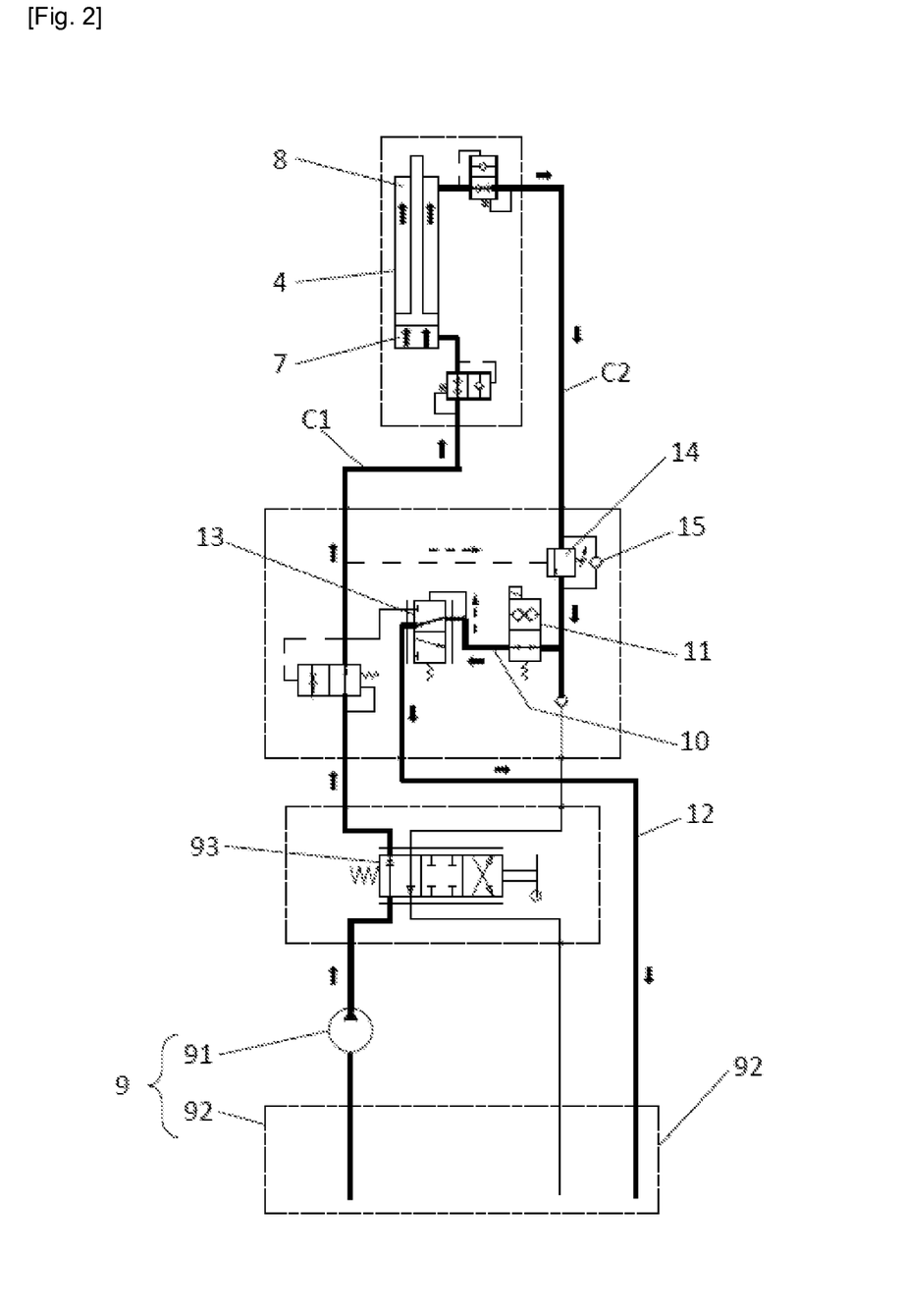
FIG. 2 represents the hydraulic circuit corresponding to the operation described in FIG. 1.

This valve 13 is placed on the fluid connection 10 between the duct C1 for connection of the chamber 7 for lifting of the forks to the hydraulic source 9 and the unit 11 for closing of said manually- or automatically-controlled 17 fluid connection 10. This offloading line 12 is used in the handling operating mode, in the state in which the forks are driven in the direction of lifting of the forks, as illustrated in FIGS. 1 and 2. It will be noted that the duct C2 for circulation of fluid which equips the chamber 8 of the lifting jack 4, known as the chamber for lowering of the forks 2, to the discharge in handling operating mode, in the state in which the forks 2 are driven for the passage of the forks from a low position to a high position, is provided with a unit 14 for closing of the duct C2 which is sensitive to the pressure of the fluid of the duct C1 for circulation of fluid of the other chamber 7, known as the chamber for lifting of the forks 2 of the lifting jack 4. This closing unit 14 is configured to go from the closed position to the open position of the duct C2 when the pressure in the duct C1 of the chamber 7 for lifting of the forks 2 of the lifting jack 4 is greater than a predetermined value in the handling operating mode, in the state in which the forks are driven in the direction of raising, as illustrated in FIGS. 1 and 2, in order to permit controlled emptying of the chamber 8 for lowering of the forks.

The unit 14 for closing of the duct C2 is fitted in parallel with a non-return valve 15. The presence of a non-return valve 15 of this type permits supply of fluid to the chamber 8 for lowering of the forks of the lifting jack, including when the pressure in the duct of the chamber 7 for lifting of the forks of the jack is lower than a predetermined value. The role of this non-return valve 15 will be described hereinafter.

Figure 3:
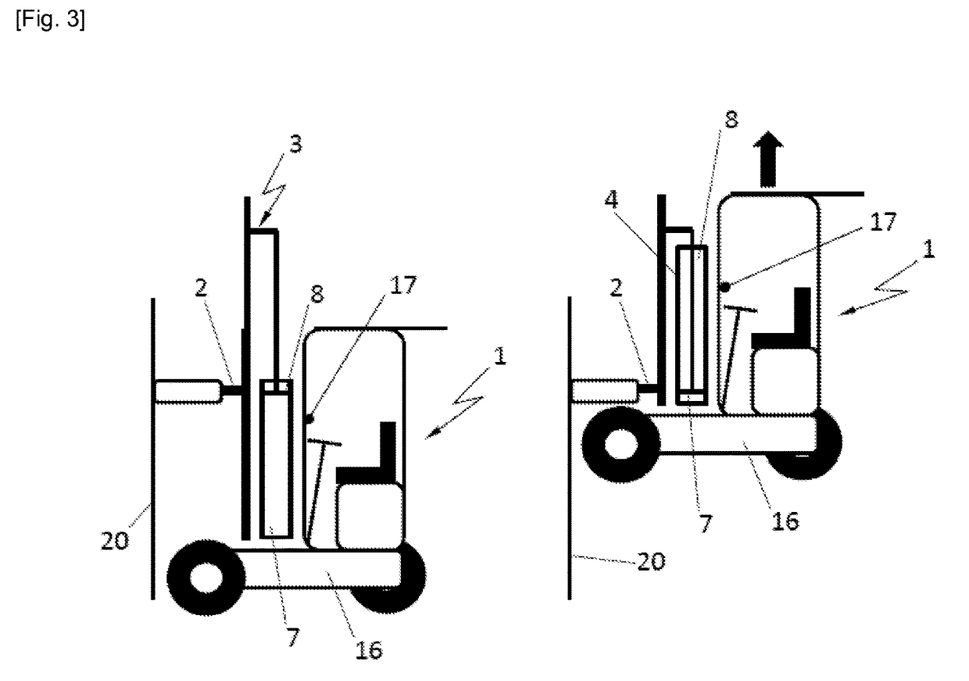
FIG. 3 represents a schematic view of two forklift trucks in order to illustrate the passage of the frame from a spaced apart position of the forks to a position in which the forks are brought closer in transport operating mode.
Figure 5:
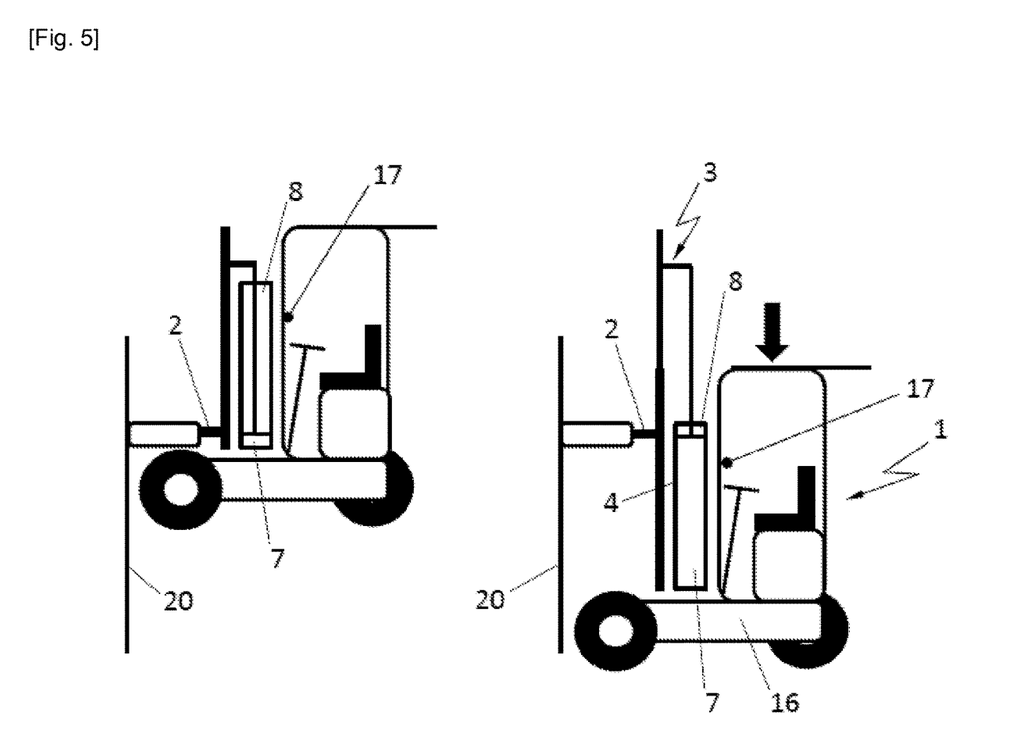
FIG. 5 represents a schematic view of two forklift trucks in order to illustrate the passage of the frame from a position in which the forks are brought closer, to a position in which the forks are spaced apart in transport operating mode.
Figure 6:
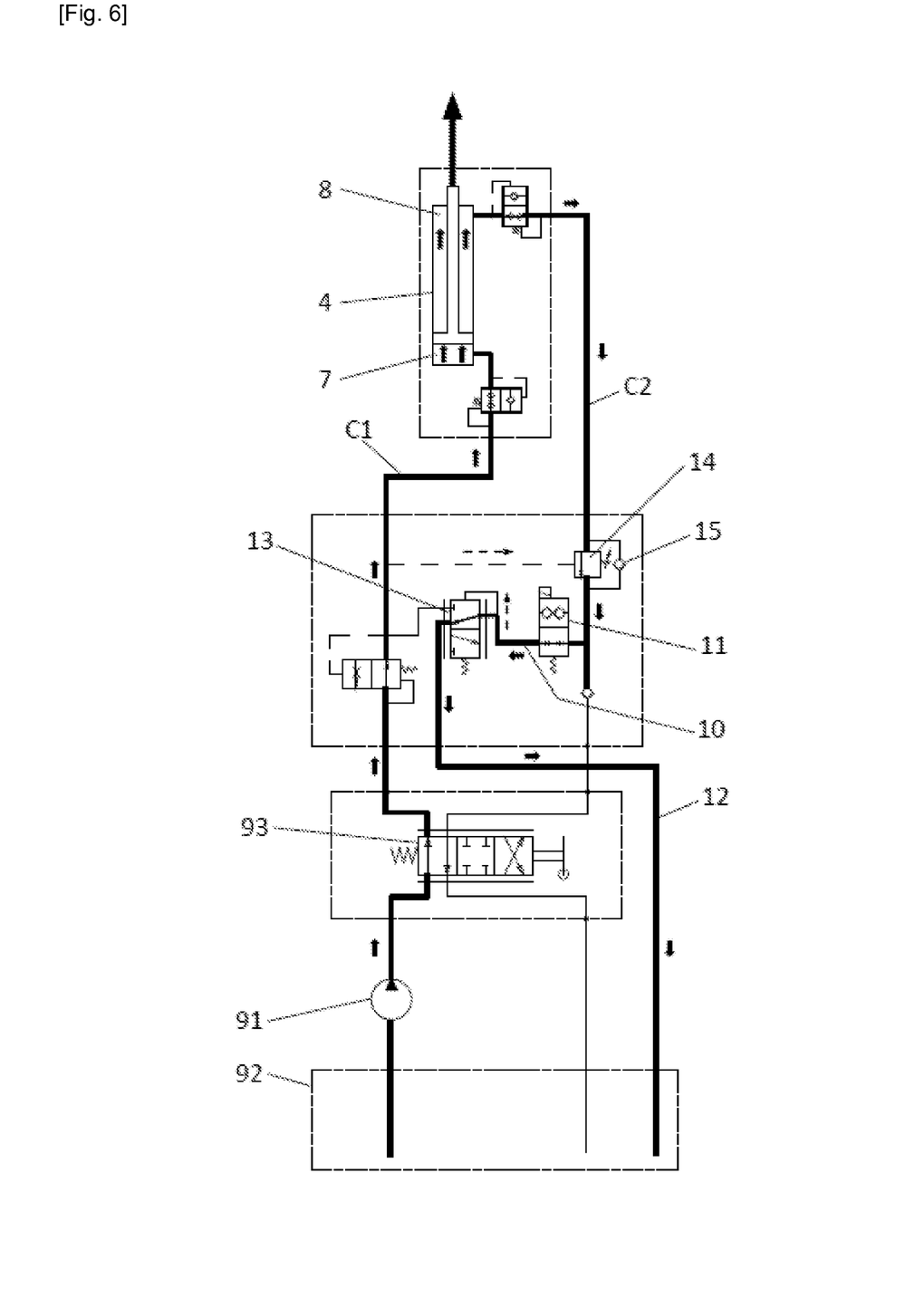
FIG. 6 represents the hydraulic circuit corresponding to the operation described in FIG. 5.

As previously stated, in addition to its handling operating mode as described above, which permits raising or lowering of the forks 2 for handling of loads by means of the forks, the forklift truck 1 comprises a transport operating mode in which the forks 2 are in the high position and immobilized in raising and lowering displacement relative to the ground, in order to permit raising of the frame 16 and loading of the truck onto a carrier vehicle 20 which is partly represented in FIGS. 1, 3 and 5. Thus, one of the chambers, known as the chamber 8 for lowering of the forks 2 of the lifting jack 4, which is configured in handling operating mode to be supplied with fluid from the other chamber, known as the chamber 7 for lifting of the forks, via the fluid connection 10 between the duct C1, C2, in the state in which the forks 2 are driven in the direction of lowering of the forks 2, in transport operating mode forms the chamber of the lifting jack 4 which is supplied with fluid by the hydraulic source 9 in the state in which the frame 16 is driven in the direction of lifting of the frame 16.

Similarly, the chamber 7 known as the chamber 7 for lifting of the forks of the lifting jack 4, which is configured in the handling operating mode to be supplied with fluid in the state in which the forks 2 are driven in the direction of lifting of the forks 2, in transport operating mode forms the chamber of said lifting jack 4 which is supplied with fluid in the state in which the frame 16 is driven in the direction of lowering of the frame 16.

Figure 4:
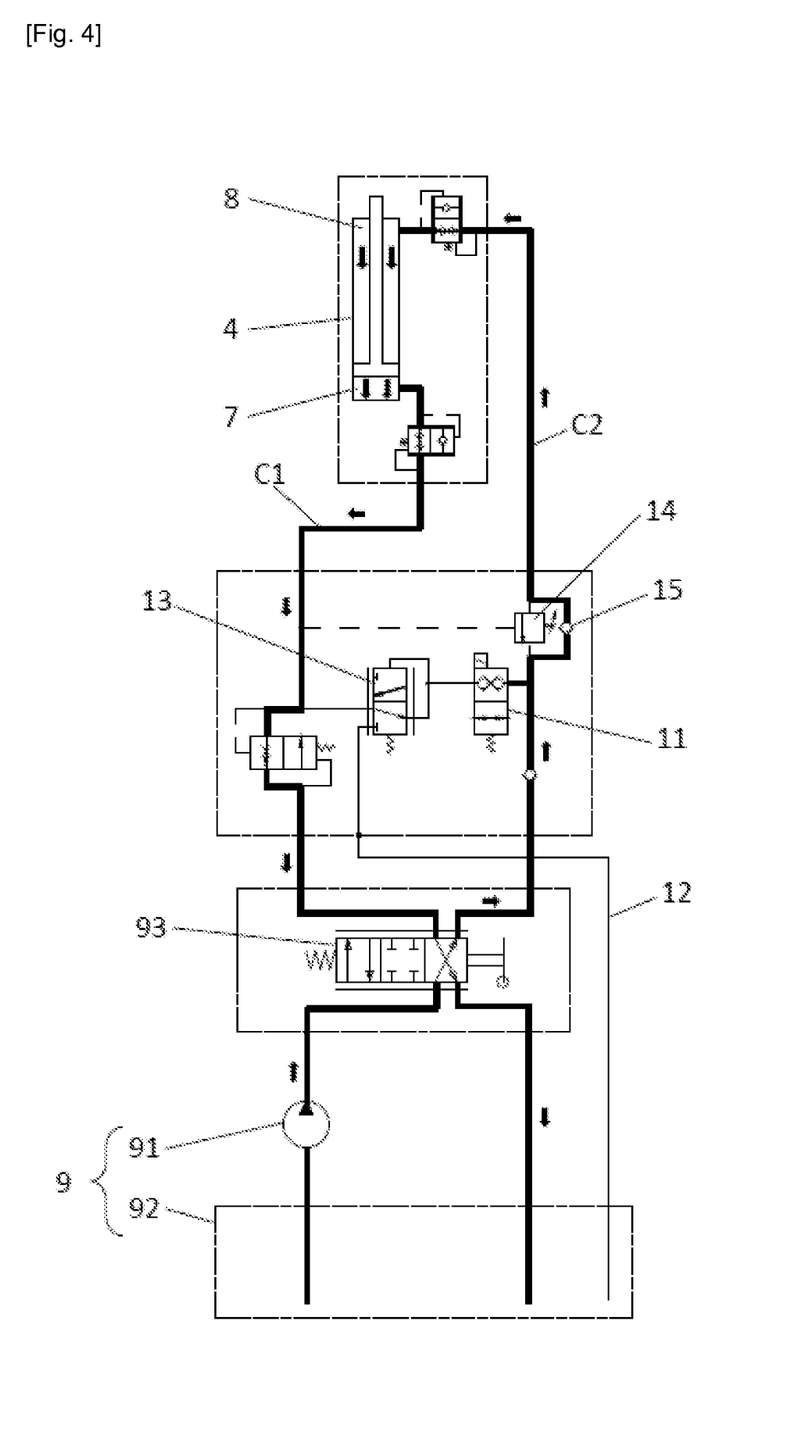
FIG. 4 represents the hydraulic circuit corresponding to the operation described in FIG. 3.

In a manner which is characteristic of the invention, the unit 11 for closing of the fluid connection 10 between the ducts C1 and C2 is in the closed position, in the transport operating mode, in the state in which the frame 16 is driven in the direction of raising of the frame 16, as illustrated in FIGS. 3 and 4. This prevents the oil which supplies the chamber 8, known as the chamber for lowering of the forks, from being able to control the pressure-sensitive valve 13 to the open position of the fluid connection 10, towards the offloading line 12, and prevents the raising of the frame 16.

It can also be noted that, in this transport operating mode, in the state in which the frame 16 is driven in the direction of raising, the fluid for supply to the chamber 8 for lowering of the forks, and subsequently raising of the frame 16, goes to the level of the duct C2 via the non-return valve 15 which is mounted in parallel with the pressure-sensitive unit 14 for closure of the duct C2 described above.

In order to permit actuation of the unit 11 for closing of the fluid connection 10 between the ducts C1 and C2, and subsequently closing of the fluid connection 10, a manual control 17 can be provided which is placed on the dashboard of the truck 1, and can be actuated by the driver of the machinery, as represented. Thus, in transport operating mode, in order to be able to control the lifting jack 4 in the direction of raising of the frame 16, the driver of the machinery must actuate this control 17, which is formed for example by a push button, which controls the supply of the solenoid valve which forms the unit 11 for closing of the fluid connection 10 in the direction of closing of said fluid connection 10. This manual control can be replaced by automatic control, thanks for example to the presence of one or a plurality of sensors which detect the immobilization of the forks, and the command for lowering of the forks corresponding to raising of the frame.

In practice, control of the forks in the direction of raising or lowering takes place conventionally by means of a control lever placed in the control cab or at the driver station. The driver of the machinery simply needs to actuate the control 17 when he wishes to switch to transport operating mode, and drive the forks in displacement in the direction of raising of the frame 16, once the forks 2 have been immobilized in the sleeves of the carrier vehicle. This control 17 can be deactivated automatically when the forklift 2 truck 1 is in its final position of transport on the carrier vehicle 20.

The invention claimed is:

1. A forklift truck mounted on a carrier vehicle, said truck comprising;
   a frame,
   forks for handling of the load and coupling of the truck to a carrier vehicle,
   a connection between the forks to the frame, said connection including at least one lifting jack to drive the forks and the frame in relative displacement in the direction of approach towards one another and moving away from one another in order to permit raising of the forks in a so-called handling operating mode, wherein the forks are mounted such as to be free in upward and downward displacement relative to ground,
   and to permit raising of the frame in a so-called transport operating mode, wherein the forks are in a high position and their displacement upwards and downwards relative to ground is then immobilized,
   the at least one lifting jack comprising at least one body and a piston rod which divides the body into two chambers, said lifting jack being a double-effect lifting jack, each chamber of which is equipped with a fluid duct for connection of the chamber to a hydraulic source comprising a pump and a reservoir via a distributor to permit supply of fluid to one or the other of the chambers,
   wherein, in the so-called handling operating mode, under the effect of their weight, the forks form a driving element for actuation of the or each lifting jack for the passage of the forks from the high position to the low position, and in that, for the or each lifting jack, the fluid ducts for connection of the chambers of the lifting jack to the hydraulic source are connected to one another by a fluid connection, in order to permit a transfer of fluid from one of the chambers in the direction of the other chamber of the jack, this fluid connection being equipped with a closing unit which is mounted such as to be mobile between a closed position and an open position of the fluid connection,
   this closing unit being in the open position when the forks form a driving element for actuation of the or each lifting jack for the passage of the forks from the high position to the low position when a predetermined pressure is reached; and
   this closing unit being in the closed position at least in the transport operating mode, in a state in which the frame is raised.

2. The forklift truck as claimed in claim 1, wherein the unit for closing of the fluid connection between the ducts is in the open position in the handling operating mode, in a state in which the forks are driven in the direction of lowering of the forks.

3. The forklift truck as claimed in claim 1, wherein one of the chambers, known as the chamber for lowering of the forks of the or each lifting jack, which chamber is configured, in the handling operating mode, to be supplied with fluid from the other chamber, known as the chamber for lifting of the forks via the fluid connection between the ducts in the state in which the forks are driven in the direction of lowering of the forks, in the transport operating mode forms the chamber of said lifting jack which is supplied with fluid by the hydraulic source in a state in which the frame is driven in the direction of raising of the frame.

4. The forklift truck as claimed in claim 1, wherein one of the chambers, known as the chamber for lifting of the forks of the or each lifting jack, which chamber is configured, in the handling operating mode, to be supplied with fluid in a state in which the forks are driven in the direction of lifting of the forks, in the transport operating mode forms the chamber of said lifting jack which is supplied with fluid in a state in which the frame is driven in the direction of lowering of the frame.

5. The forklift truck as claimed in claim 1, wherein the fluid connection between the ducts is placed on a portion of the ducts which extends between the distributor and the lifting jack.

6. The forklift truck as claimed in claim 1, wherein the fluid connection between the ducts is provided with an offloading line which is equipped in an area of connection to the fluid connection with a pressure-sensitive valve which can go from the closed position to the open position of the offloading line according to the pressure which exists at the fluid connection between the ducts.

7. The forklift truck as claimed in claim 1, wherein a fluid duct of the fluid ducts which equips the chamber of the lifting jack known as the chamber for lowering of the forks at discharge, in the handling operating mode in a state in which the forks are driven in displacement for a passage of the forks from a low position to a high position, is provided with a unit for closing of the duct, which unit is sensitive to a pressure of the fluid of the fluid circulation duct of the other chamber, known as the lifting chamber, of the forks of the lifting jack, said closing unit being configured to go from the closed position to the open position of the duct, when the pressure on the duct of the lifting chamber of the forks of the lifting jack is greater than a predetermined value.

8. The forklift truck as claimed in claim 7, wherein the unit for closing of the duct is mounted in parallel with a non-return valve.

9. The forklift truck as claimed in claim 1, wherein the unit for closing of the fluid connection between the ducts is a closing unit with manual control which can be actuated by a driver of the truck.

10. The forklift truck as claimed in claim 1, wherein the unit for closing of the fluid connection between the ducts is a solenoid valve which is normally preferably open.

11. A forklift truck mounted on a carrier vehicle, said truck comprising;

a frame, forks for handling of the load and coupling of the truck to a carrier vehicle, a connection between the forks to the frame, said connection including at least one lifting jack to drive the forks and the frame in relative displacement in the direction of approach towards one another and moving away from one another in order to permit raising of the forks in a so-called handling operating mode, wherein the forks are mounted such as to be free in upward and downward displacement relative to ground, and to permit raising of the frame in a so-called transport operating mode, wherein the forks are in a high position and their displacement upwards and downwards relative to ground is immobilized, the at least one lifting jack comprising at least one body and a piston rod which divides the body into two chambers, said lifting jack being a double-effect lifting jack, each chamber of which is equipped with a fluid duct for connection of the chamber to a hydraulic source comprising a pump and a reservoir via a distributor to permit supply of fluid to one or the other of the chambers, wherein, in the so-called handling operating mode, under the effect of their weight, the forks form a driving element for actuation of the or each lifting jack for the passage of the forks from the high position to the low position, and in that, for the or each lifting jack, the fluid ducts for connection of the chambers of the lifting jack to the hydraulic source are connected to one another by a fluid connection, in order to permit a transfer of fluid from one of the chambers in the direction of the other chamber of the jack, this fluid connection being equipped with a closing unit which is mounted such as to be mobile between a closed position and an open position of the fluid connection, this closing unit being in the closed position at least in the transport operating mode, in a state in which the frame is driven in the direction of raising of the frame, wherein the unit for closing of the fluid connection between the ducts is a solenoid valve.

* * * * *